United States Patent [19]

Shelvik

[11] 4,435,739
[45] Mar. 6, 1984

[54] HOLD-DOWN BRACKET FOR PLUG-IN CIRCUIT BREAKER

[75] Inventor: Bertrum S. Shelvik, Milwaukee, Wis.

[73] Assignee: Eaton Corporation, Cleveland, Ohio

[21] Appl. No.: 373,913

[22] Filed: May 3, 1982

[51] Int. Cl.³ .............................................. H02B 1/04
[52] U.S. Cl. .................................... 361/346; 361/363
[58] Field of Search ............... 361/346, 347, 350, 351, 361/353, 354, 357, 360, 363, 376, 356, 358, 427; 200/42 R, 42 T, 44; 339/37, 198 N, 82, 91 R

[56] References Cited

U.S. PATENT DOCUMENTS

| | | | |
|---|---|---|---|
| 2,530,548 | 11/1950 | Stanley | 361/363 |
| 2,883,587 | 4/1959 | Dorfman et al. | 361/363 |
| 3,159,771 | 1/1964 | Duvall | 361/363 |
| 3,174,078 | 3/1965 | Koenig | 361/363 |
| 3,218,520 | 11/1965 | Casey | 361/363 |
| 3,258,652 | 6/1966 | Galante et al. | 361/363 |
| 3,611,048 | 10/1971 | Shelvik | 361/361 |

Primary Examiner—J. V. Truhe
Assistant Examiner—Greg Thompson
Attorney, Agent, or Firm—C. H. Grace; L. G. Vande Zande

[57] ABSTRACT

An electric circuit breaker panelboard equipped for lug main connection (22,24) and having a plug-in main circuit breaker (26,28) held securely in place by bracket (36) secured to the panel (2) by a screw (38) and having a forward hook (36c) overlying a forward edge (26c) of an insulating barrier adjacent the load side connector (26b) of the breaker. The bracket (36) has a ledge (36d) overlying a mounting rail (2b) on the panel (2) in position below the hook portion (36c) such that movement of the breaker (26,28) in a direction to cause separation of the plug-in electrical connection thereof with the panelboard exerts a bending on the bracket and a compressive force on the mounting rail to resist such movement. The bracket is colored red to be clearly visible and serve as a warning against removal of the main breaker under electrical power.

13 Claims, 5 Drawing Figures

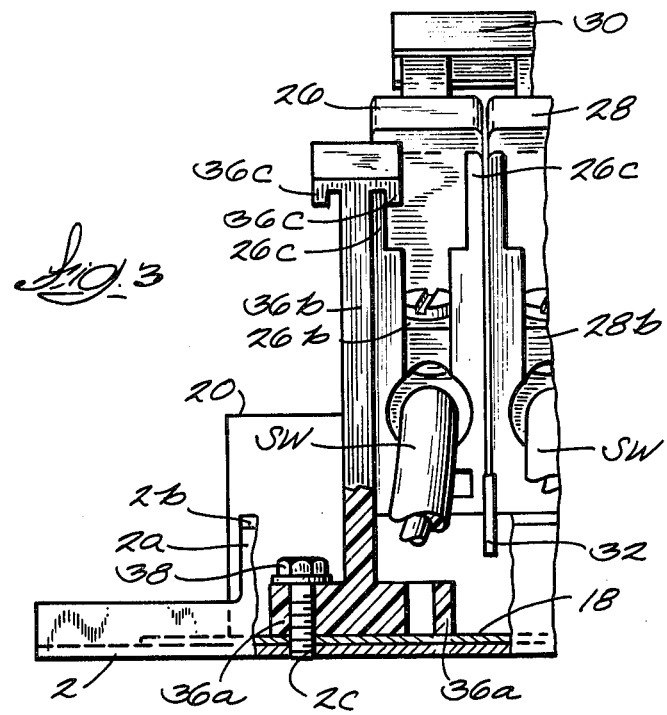
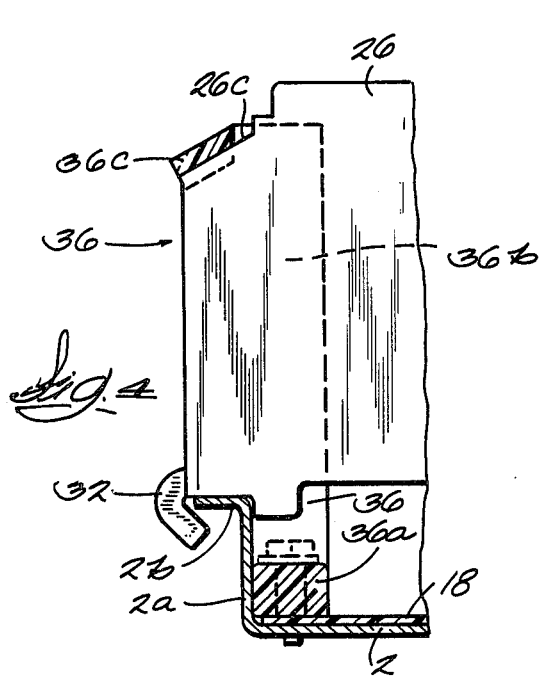

HOLD-DOWN BRACKET FOR PLUG-IN CIRCUIT BREAKER

BACKGROUND OF THE INVENTION

This invention relates to electric circuit breaker panelboards and more particularly to such panelboards which utilize a plug-in circuit breaker as a main disconnect circuit breaker to provide service disconnect capability for the panelboard. Specifically, the invention relates to a bracket which may be assembled to the panelboard in the field which inhibits the removal of the main circuit breaker from the panelboard by a mere unplugging or pulling action.

Distributors of electrical panelboard apparatus stock a high proportion of panelboards which have lug main connectors provided thereon and which are suitable for use as feeder panelboards. However, to qualify as service entrance equipment, it is necessary to provide a main disconnect switch for the panelboard whereby power to the panelboard may be interrupted by operating the switch. This is accomplished by providing a two or three pole circuit breaker on the panelboard and connecting the incoming supply wires to the circuit breaker to thereby feed the panelboard bus through that circuit breaker. To protect against the electrical hazards that may exist if the main circuit breaker is unplugged from the panelboard while wired and under power by an unauthorized or unknowledgable workman, it is preferred to provide a means of securing that circuit breaker to the panelboard which will require consideration and the use of a tool in order to affect its removal. Copending patent application entitled "Electrical Panelboard With Main Breaker Hold-Down" in the name of Donald A. Link and John A. Swessel Jr. and assigned to the Assignee of this application discloses one form of hold-down means which may be factory installed on a panelboard assembled solely for main circuit breaker service disconnect application. This means comprises a Z-shaped bracket which bolts to the panel at one horizontal leg thereof and has the opposite horizontal leg overlying the front surface of the main breaker. This device may not be used on panelboards having lug main provisions because the bracket is installed in the area which is occupied by the lug mains. Moreover, a specially notched deadfront cover is required for that panelboard to permit the forward end of the Z-shaped bracket to extend over the front surface of the main breaker. Other hold-down devices have been provided for main circuit breakers for panelboards in the past, but these devices generally required removal of the panel from the installation in order to gain side access to the panel to remove the hold-down device. This is, of course, objectionable to the electrician servicing the panel.

SUMMARY OF THE INVENTION

There is provided herein a hold-down bracket which may be installed to a panelboard equipped with lug mains which will engage a main circuit breaker to inhibit the removal of that breaker by a mere pulling or unplugging action. The bracket requires no further modification of the panel, does not interfere with the cover for the panel and may be used on either side of the panelboard. The bracket engages an existing rib on the circuit breaker and has a portion interacting with a mounting rail on the panel which operates under compression to resist any attempt to unplug that breaker from the panelboard.

BRIEF DESCRIPTION OF THE DRAWINGS

FIG. 3 is a side view of the left-hand side of the panel assembly of FIG. 1 with portions thereof broken away;

FIG. 4 is a fragmentary sectional view taken substantially along the line 4—4 of FIG. 1; and FIG. 5 is a perspective view of the hold-down bracket of this invention.

DESCRIPTION OF THE PREFERRED EMBODIMENT

Figure 1:
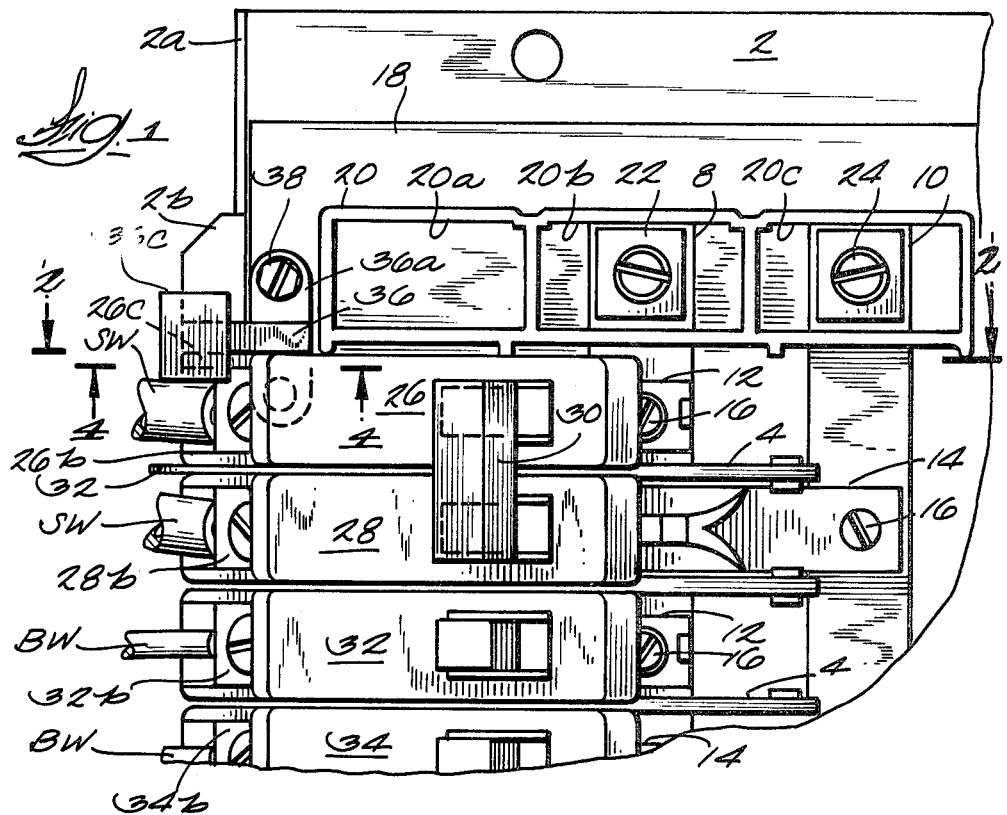
FIG. 1 is a fragmentary front view of a panel assembly for an electrical distribution panelboard having a plug-in main circuit breaker and the hold-down bracket of this invention.

In FIG. 1 there is shown a panel 2 for a panelboard which is like that disclosed and claimed in U.S. Pat. No. 3,611,048 issued Oct. 5, 1971 to Bertrum S. Shelvik and assigned by mesne assignments to the assignee of the present application. The disclosure of U.S. Pat. No. 3,611,048 is incorporated herein by reference. The panel 2 has upstanding or forwardly projecting flanges 2a extending along its vertical lateral edges, only one of which is shown in the drawings, the outer ends of which are formed over to project outwardly and provide a mounting rail 2b. A plurality of insulating mounting members 4 are secured to the panel in a centrally located vertical row by screws 6 (FIG. 2) which extend through the panel 2 from the rear. A pair of vertically extending bus bars 8 and 10 are attached to the mounting members 4 by branch connectors 12 and 14 which are secured to the respective bus bars by screws 16. Reference may be had to the aforementioned patent for a more complete understanding of the manner in which the bus bars and branch circuit connectors cooperate to mount the bus bars to the insulators 4. A flat sheet of insulating material 18 is disposed on the panel 2 between the panel and the insulating mounting members 4.

At the upper end of the panel 2 adjacent the uppermost mounting member 4, a lug main insulator 20 is disposed over the projecting ends of the bus bars 8 and 10. The lug main insulator comprises three forwardly directed openings or pockets 20a, 20b, and 20c which provide frontal access to the bus bars. The insulator is provided with three pockets to enable the same insulator to be utilized on a panelboard having three bus bars. However, only the center and right-hand pockets 2b and 2c contain bus bars in the particular embodiment disclosed herein. Secured to the bus bars within the pockets 2b and 2c are screw-type pressure connectors 22 and 24 which will accommodate supply wires from the upper side through suitable aligned openings in the insulator 20. When the panel is to be used as a feeder panel, the incoming supply wires would be connected to the bus bars 8 and 10 at the lugs 22 and 24, thereby supplying power to the bus bars 8 and 10 and to the respective branch circuit connectors 12 and 14.

Figure 2:
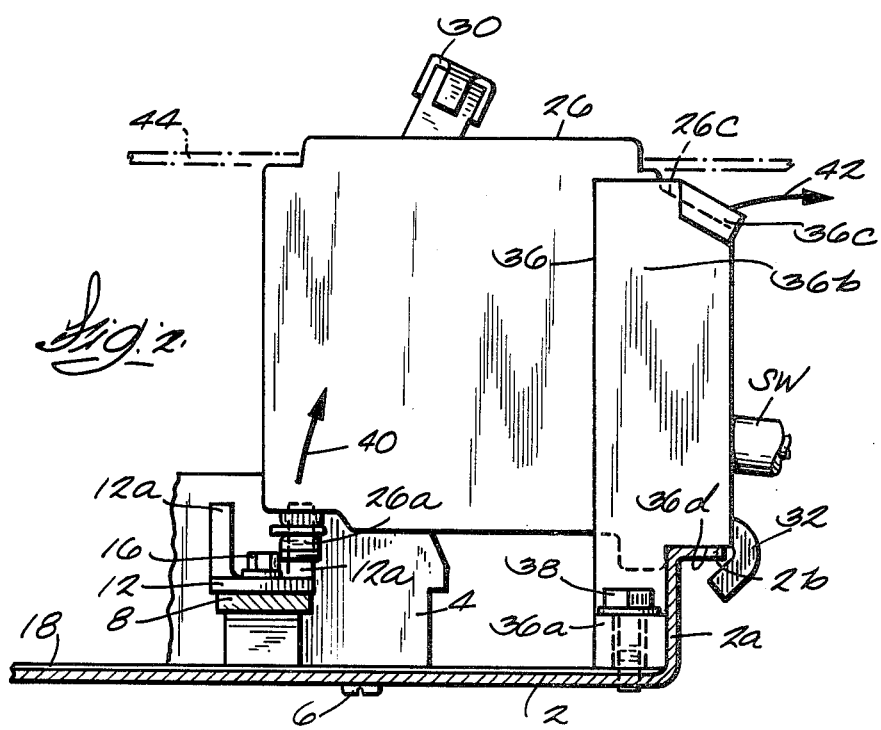
FIG. 2 is a cross-sectional view of the assembly of FIG. 1 taken substantially along the line 2—2 of FIG. 1.

When it is desired to use the panelboard as service entrance equipment, it is necessary to provide a main disconnect switch for the panelboard. To achieve this, a double pole circuit breaker comprising two single pole breakers 26 and 28 physically secured together side-by-side is mounted in the first two spaces below the lug main insulator 20. A handle tie member 30 is secured to the operator handles of the two breakers 26 and 28 to cause them to be operated simultaneously. As seen in FIG. 2 the breakers are attached to the panelboard by engaging a hook 32 over the mounting rail 2b and pivoting the opposite end of the breaker downwardly onto the respective branch connectors 12 and 14. In FIG. 2, breaker 26 is provided with depending contact clip 26a which engages with upstanding stab portions 12a on branch connector 12. Although not specifically shown, breaker 28 is provided with a similar contact clip to engage similar stab portions on the branch connector 14. The supply wires SW, instead of being connected to the lugs 22 and 24, are connected to the pressure connector terminals 26b and 28b of the respective breakers to supply incoming electrical energy to the breaker. When the breaker handle is on the ON position and the breaker contacts are closed, electrical energy is supplied through the breaker to the respective bus bars 8 and 10 through the plug-on connections with the branch circuit connectors 12 and 14. Additional single pole breakers such as 32 and 34 are similarly mounted to the panelboard and have plug-in connector portions engaging with the branch circuit connectors 12 and 14 in their respective spaces. These breakers receive electrical energy from the bus bars 8 and 10 through the respective plug-in connections and supply that energy to the respective branch circuits through the branch wires BW attached to the pressure connectors 32b and 34b, respectively, at the side of the circuit breaker 32 or 34.

To inhibit removal of the main breaker 26-28, a hold-down bracket 36 is provided. The bracket is best seen in the pictorial view FIG. 5. It comprises a base portion having a pair of oppositely extending mounting feet 36a, each of which is provided with an opening therethrough, a shank portion 36b extending upwardly from a point intermediate the mounting feet 36a and a pair of inverted troughs, or hooks 36c on opposite sides of the upper end of shank 36b. The width of the mounting feet 36a enable the bracket 36 to fit between a side flange 2a of panel 2 (FIG. 1) and an adjacent end of lug main insulator 20. The bracket 36 is positioned on the panel such that shank 36b extends forwardly along a side surface of breaker 26 and one hook 36c overlies an angular rib 26c (FIG. 3) defining an access cavity for the pressure connector 26b of breaker 26. As seen in FIGS. 1 and 3, one of the mounting feet 36a extends beneath the breaker 26 while the other mounting foot 36a is exposed to the upper side thereof. A screw 38 extends through the opening in the exposed mounting foot 36a and threadably engages with a hole 2c (FIG. 3) in the panel 2 to secure the bracket 36 tightly upon the panel. Shank 36b is stepped at its lower end to conform to the profile of flange 2a and mounting rail 2b of panel 2 (FIG. 2). This step provides an overhanging surface 36d for the bracket which rests upon the front surface of mounting rail 2b.

With further reference to FIG. 2, the main breaker 26-28 may be safely removed from the panel when the operating mechanism thereof is switched to the OFF position. Assuming the bracket 36 not to be in place, removal is accomplished by pivoting the breaker clockwise about the mechanical connection of hook 32 with mounting rail 2b to separate the plug-in connectors 26a and the similar connectors for breaker 28 from the branch circuit connectors in the direction of arrow 40. This clockwise movement causes rib 26c to move laterally outward in the direction of arrow 42. When bracket 36 is installed, the aforedescribed clockwise movement of rib 26c is resisted by hook 36c which engages the rib 26c. The outward force in the direction of arrow 42 presents a bending moment to the bracket 36 about its lower end and such moment also urges the overhanging surface 36d against the mounting rail 26, thereby effectively rendering the right-hand side of bracket 36 (when viewed in FIG. 2) under compression with the panel through mounting rail 2b. The cooperative stepped configuration of the lower end of bracket 36 with the panel 2 affords the bracket a significant mechanical advantage advantage in view of a relatively narrow mounting base to resist removal of the breaker from the panel.

The upper surface of inverted trough or hook portions 36c may be provided with suitable indicia forwarning the workman against removal of the main breaker under electrical power. It is also preferable to mold the bracket 36 of a thermoplastic insulating material which may be colored a contrasting color to that of the surrounding circuit breakers and panelboard components in order to be clearly evident to a workman who has removed the panelboard cover 44 shown in dotted lines in FIG. 2. In a preferred form, the bracket 36 is colored red in conformance with the recognized convention for danger in electrical apparatus. Moreover, bracket 36 is formed symmetrical about the plane of shank 36b, having two mounting feet 36a and two hooks 36c. In the event that the main circuit breaker is located on the righthand side of the panel, as viewed in FIG. 1, i.e. overlying the bus bars 8 and 10, the bracket 36 may be used in conjunction therewith by simply reversing it 180 degrees and assembling screw 38 into the opposite mounting foot 36a (from FIG. 1) and hole 2c.

Accordingly there is provided herein a hold-down bracket which may be utilized in a panelboard having lug mains which is desired to be used as service entrance equipment by the provision of a main circuit breaker disconnect switch. The bracket is intended to be hidden from view when the panelboard is enclosed with its cover for normal use, but to be plainly evident when such cover is removed. While the bracket is disclosed herein in a preferred embodiment, it is to be understood that it is susceptible of various modifications without departing from the scope of the appended claims.

I claim:

1. In an electrical panelboard having a plurality of plug-in circuit breakers, the combination comprising:
a panel;
a mounting rail on said panel for mounting one end of said circuit breakers;
insulating means mounted on said panel;
a plurality of bus bars supported by said insulating means, said bus bars being transversely spaced with respect to said mounting rail extending along said panel parallel to said mounting rail and said bus bars having first plug-in connector means spaced at intervals along their length;
a multi-pole main circuit breaker having a plurality of second plug-in connector means cooperably engagable with respective ones of said first plug-in connector means, one end of said multi-pole main circuit breaker being mounted to said mounting rail and said second plug-in connector means being engaged with respective ones of said first plug-in connector means, said main circuit breaker having wire receiving terminals for connecting said main circuit breaker to a source of electrical power; and hold-down means secured to said panel, said hold-down means having a first portion overlying said mounting rail and a second portion overlying a forward portion of said main circuit breaker, said second portion being positioned with respect to said first portion such that force exerted on said second portion by movement of said main circuit breaker in a direction to effect separation of said first and second plug-in connector means causes said first portion to be compressed against said mounting rail, thereby resisting said movement of said circuit breaker.

2. The invention according to claim 1 wherein said hold-down means is a bracket mounted to said panel immediately adjacent said mounting rail, and said first portion comprises an overhanging ledge which overlies said mounting rail whereby movement of the breaker in a direction to effect separation of said first and second plug-in connector means causes said breaker to exert a bending moment upon said bracket, compressing said overhanging ledge upon said mounting rail.

3. The invention according to claim 2 wherein said second portion is substantially forwardly aligned with said mounting rail and engages said main circuit breaker in a forward and a lateral direction to resist pivotal movement of said one end of said main circuit breaker laterally outward of said panel.

4. The invention according to claim 3 wherein said second portion engages an inclined forward surface of said main circuit breaker, said surface being inclined from said one end toward the other end of said main circuit breaker, and said second portion being correspondingly inclined for parallel engagement with said surface.

5. The invention according to claim 4 wherein said second portion comprises a hook open toward said mounting rail, and said inclined forward surface comprises a rib over which said hook is disposed.

6. The invention according to claim 5 wherein said bracket comprises a forwardly projecting shank portion having said hook formed at a forward end thereof and a mounting foot formed at the rearward end thereof, said foot and said hook being disposed on opposite sides of said shank.

7. The invention according to claim 6 wherein said bracket comprises a pair of hooks formed at opposite sides of said forward end and a pair of feet formed at said rearward end, whereby said bracket may be mounted on either of opposite sides of said panel by rotating it 180 degrees about its forwardly projecting axis.

8. The invention according to claim 7 wherein said bracket is molded of insulating material.

9. The invention according to claim 8 wherein said bracket is molded of thermoplastic material.

10. The invention according to claim 7 wherein said bracket is colored a contrasting color to that of said main circuit breaker and said panel for high visibility.

11. The invention according to claim 7 wherein said bracket is colored to conform to a recognized code for warning.

12. The invention according to claim 2 wherein said panelboard comprises a lug main insulator disposed over said bus bars at projecting ends thereof, said insulator extending transversely of said panel toward said mounting rail, and said bracket being mounted to said panel between said mounting rail and said lug main insulator.

13. The invention according to claim 2 wherein said panelboard comprises a cover overlying said main circuit breaker, said cover having an opening therein, said forward portion of said main circuit breaker having a plurality of levels, one level projecting through said opening in said cover and another level disposed rearwardly of said cover in spaced relation thereto, and said second portion of said bracket overlies said another level of said forward portion of said circuit breaker rearwardly of said cover.

* * * * *